United States Patent
Nagata (10) Patent No.: US 12,407,842 B2
(45) Date of Patent: Sep. 2, 2025

(54) AUTONOMOUS TRAVELING VEHICLE INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventor: Yu Nagata, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 540 days.

(21) Appl. No.: 17/858,502

(22) Filed: Jul. 6, 2022

(65) Prior Publication Data
US 2023/0031034 A1 Feb. 2, 2023

(30) Foreign Application Priority Data
Aug. 2, 2021 (JP) ................. 2021-126916

(51) Int. Cl.
*H04N 19/42* (2014.01)
*G06T 3/40* (2006.01)
*H04N 7/18* (2006.01)
(52) U.S. Cl.
CPC ............ *H04N 19/42* (2014.11); *G06T 3/40* (2013.01); *H04N 7/183* (2013.01)

(58) Field of Classification Search
CPC ........... H04N 19/42; H04N 7/183; G06T 3/40
See application file for complete search history.

(56) References Cited

U.S. PATENT DOCUMENTS

| 2020/0369298 | A1* | 11/2020 | Jikumaru ............. G05D 1/0088 |
| 2021/0056774 | A1  | 2/2021  | Arai et al. |
| 2021/0092331 | A1* | 3/2021  | Terauchi ................ B60R 1/074 |
| 2021/0400209 | A1  | 12/2021 | Yamanaka et al. |
| 2021/0400241 | A1  | 12/2021 | Yamanaka et al. |
| 2023/0403463 | A1* | 12/2023 | Ogawa ................. G08G 1/0112 |

FOREIGN PATENT DOCUMENTS

| CN | 113039778 A | 6/2021 |
| JP | 2020-061120 A | 4/2020 |
| JP | 2020174295 A | * 10/2020 |
| JP | 2021-026687 A | 2/2021 |

* cited by examiner

*Primary Examiner* — Andrew M Moyer
*Assistant Examiner* — Dylan John Mendez Muniz
(74) *Attorney, Agent, or Firm* — Sughrue Mion, PLLC (57) ABSTRACT

A controller is configured to change a volume of image data to be transmitted according to the image data to be transmitted, at the time of transmitting at least one of first image data obtained by imaging an outside of an autonomous traveling vehicle and second image data obtained by imaging an inside of the autonomous traveling vehicle.

10 Claims, 8 Drawing Sheets

AUTONOMOUS TRAVELING VEHICLE INFORMATION PROCESSING METHOD, AND NON-TRANSITORY STORAGE MEDIUM

CROSS REFERENCE TO THE RELATED APPLICATION

This application claims the benefit of Japanese Patent Application No. 2021-126916, filed on Aug. 2, 2021, which is hereby incorporated by reference herein in its entirety.

BACKGROUND

Technical Field

The present disclosure relates to an information processing apparatus, an information processing method, and a non-transitory storage medium storing a program.

Description of the Related Art

There has been known a technology that obtains vehicle information from a vehicle to be monitored by a monitoring person, determines a monitoring priority for the vehicle based on the vehicle information, and determines the information to be presented for monitoring the vehicle based on the monitoring priority thus determined (for example, see Patent Literature 1).

CITATION LIST

Patent Literature

Patent Literature 1: Japanese Patent Application Laid-Open Publication No. 2020-061120

SUMMARY

An object of the present disclosure is to transmit image data that is suitable for monitoring an autonomous traveling vehicle.

One aspect of the present disclosure is directed to an information processing apparatus including a controller configured to perform:
changing a volume of image data to be transmitted according to the image data to be transmitted, at the time of transmitting at least one of first image data obtained by imaging an outside of an autonomous traveling vehicle and second image data obtained by imaging an inside of the autonomous traveling vehicle.

Another aspect of the present disclosure is directed to an information processing method for causing a computer to perform:
changing a volume of image data to be transmitted according to the image data to be transmitted, at the time of transmitting at least one of first image data obtained by imaging an outside of an autonomous traveling vehicle and second image data obtained by imaging an inside of the autonomous traveling vehicle.

A further aspect of the present disclosure is directed to a non-transitory storage medium storing a program for causing a computer to perform:
changing a volume of image data to be transmitted according to the image data to be transmitted, at the time of transmitting at least one of first image data obtained by imaging an outside of an autonomous traveling vehicle and second image data obtained by imaging an inside of the autonomous traveling vehicle.

In addition, a still further aspect of the present disclosure is directed to the program described above.

According to the present disclosure, it is possible to transmit image data suitable for monitoring an autonomous traveling vehicle.

DESCRIPTION OF THE EMBODIMENTS

An information processing apparatus, which is one aspect of the present disclosure, includes a controller that performs changing the capacity or volume of image data to be transmitted according to the image data to be transmitted, at the time of transmitting at least one of first image data obtained by imaging an outside of an autonomous traveling vehicle and second image data obtained by imaging an inside of the autonomous traveling vehicle.

The first image data and the second image data are, for example, data of images which are imaged or captured in such a manner that a vehicle manager can monitor the outside and the inside of the autonomous traveling vehicle (hereinafter, also simply referred to as a vehicle). The images may be either moving images or still images. The volume of an image correlates with a size of the image, a resolution of the image, a frame rate of the image, or a file size of image data. For example, the larger the volume of the image, the sharper the image will be. The first image data is, for example, image data that captures an area where safety check or confirmation is required when driving the vehicle, and is, for example, image data that captures an area where other vehicles, pedestrians, obstacles or the like around the vehicle can be discriminated. Also, the second image data is image data that captures an area required to monitor passengers.

Here, when the image data is transmitted to the outside, the time required for communication varies depending on the volume of the image data. For example, the larger the amount or volume of image data, the longer the communication time will be. Then when the communication time at the time of transmitting image data becomes long, a temporal delay (hereinafter, also referred to as a time delay) occurs between an actual situation and a situation at the time of image capture. In the case of remotely monitoring the vehicle, it is generally desirable that the time delay be small, but on the other hand, some time delay may be allowed.

For example, in cases where the manager monitors the vehicle when the vehicle turns right or left or passes through a merging point of roads, it is desirable that the time delay be short. In this case, it is required to shorten the time delay rather than to obtain a clear image. On the other hand, in cases where the manager monitors the inside of the vehicle, it may be more important to obtain a clear image than to shorten the time delay. For example, when determining whether or not a passenger is standing, or whether or not a passenger is collapsed, or whether or not a passenger is unconscious, based on the passenger's appearance, behavior, facial condition, or the like, a slight time delay is not a problem and a clear image is required.

Therefore, the controller changes the volume of the image data to be transmitted according to the image data to be transmitted. Thus, the image data can be transmitted according to the volume required for the image data to be transmitted.

For example, the controller may make the volume of the first image data at the time of transmitting only the first image data smaller than the volume of the second image data when transmitting only the second image data. By making the volume of the first image data relatively small, it is possible to shorten the time delay at the time of transmitting the first image data. Therefore, the outside of the vehicle can be monitored in real time. The volume of the first image data at this time may be, for example, such a volume that other vehicles, pedestrians, obstacles, or the like can be discriminated.

On the other hand, the resolution of the second image data can be increased by making the volume of the second image data relatively large. Therefore, it is possible to more reliably grasp the state of the passenger inside the vehicle. The volume of the second image data at this time, for example, should be large enough to recognize the facial expression of the passenger.

In addition, the controller may be configured to make the volume of the second image data at the time of transmitting both the first image data and the second image data smaller than the volume of the second image data when transmitting only the second image data. For example, it can be considered that, immediately after the vehicle departs from a bus stop or the like, monitoring based on the first image data may be performed in order to monitor whether or not another vehicle is approaching, and in addition, monitoring based on the second image data may be performed in order to monitor the state of newly boarded passengers. In this case, the first image data and the second image data are required. In this way, when the outside and the inside of the vehicle are monitored at the same time, it becomes necessary to obtain both the first image data and the second image data. However, in cases where the first image data and the second image data are transmitted, a total volume of both data may become large, and thus there is a concern that the time delay may become long. Therefore, when both the first and second image data are transmitted, the volume of the second image data is made smaller than when only the second image data is transmitted, whereby the total volume of both the first image data and the second image data at the time of transmission thereof is reduced. As a result, it is possible to shorten the time delay at the time of transmitting both the first image data and the second image data. Here, note that when both the first image data and the second image data are transmitted, the volume of the second image data becomes small, but priority is given to monitoring the outside and inside of the vehicle at the same time. In cases where both the first image data and the second image data are transmitted, the volumes of the first image data and the second image data may be the same or different.

Moreover, the controller may transmit at least one of the first image data and the second image data to a server that monitors the autonomous traveling vehicle in response to a request from the server. For example, the first image data or the second image data is transmitted from the server to the vehicle based on an input from the manager. In this case, only the image data requested from the vehicle needs to be transmitted, and hence, there is no need to transmit unnecessary image data.

Further, the controller may compress the first image data and the second image data at a predetermined compression rate. In this way, the communication time can be shortened by compressing both the first and second image data, so that the time delay can be reduced. Note that the vehicle may be able to update compression format. When the compression rate is made higher by updating the compression format, clearer image data can be transmitted, or transmission with a shorter time delay can be performed.

In addition, the first image data or the second image data may include a plurality of pieces of image data. For example, a plurality of cameras for capturing images of the outside of the vehicle or a plurality of cameras for capturing images of the inside of the vehicle may be provided. By monitoring based on the plurality of pieces of image data in this manner, blind spots can be reduced.

Hereinafter, embodiments of the present disclosure will be described based on the accompanying drawings. The configurations of the following embodiments are examples, and the present disclosure is not limited to the configurations of the embodiments. In addition, the following embodiments can be combined with one another as long as such combinations are possible and appropriate.

First Embodiment

Figure 1:
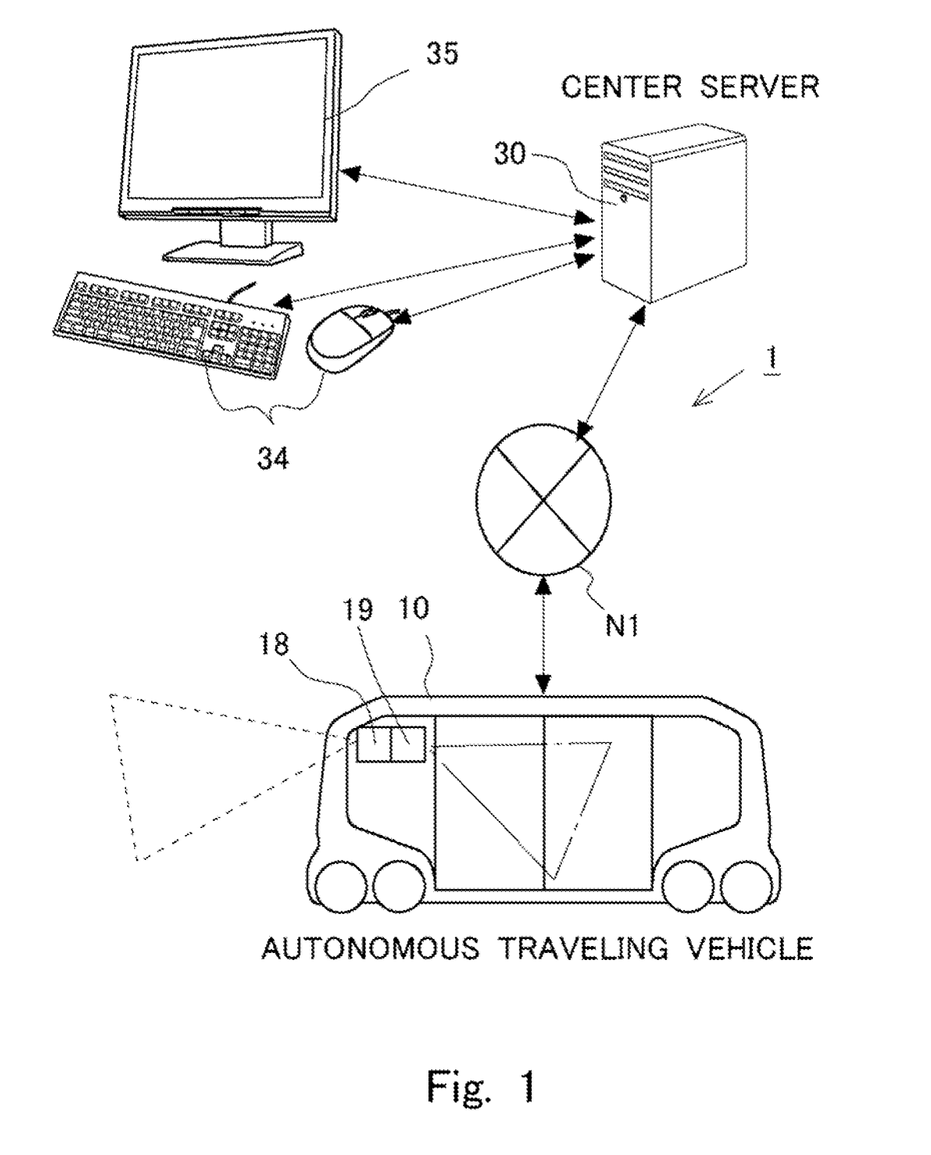
FIG. 1 is a view illustrating a schematic configuration of a system according to an embodiment.

FIG. 1 is a view illustrating a schematic configuration of a system 1 according to a first embodiment. The system 1 includes an autonomous traveling vehicle 10 (hereinafter also simply referred to as a vehicle 10) that autonomously travels based on operation commands given to it, and a center server 30 that issues the operation commands to monitor the vehicle 10. Although the system 1 illustrated in FIG. 1 includes one vehicle 10 as an example, there may be a plurality of vehicles 10. The vehicle 10 is, for example, a vehicle that moves on a predetermined route while carrying a customer or customers. The predetermined route may be a route such as a bus route or the like which has been determined in advance, or may be a route such as for a taxi that is determined based on a request of a passenger.

The vehicle 10 and the center server 30 are connected to each other by means of a network N1. The network N1 is, for example, a worldwide public communication network such as the Internet or the like, and a WAN (Wide Area Network) or other communication networks may be adopted. Also, the network N1 may include a telephone communication network such as a mobile phone network or the like, or a wireless communication network such as Wi-Fi (registered trademark) or the like.

An external camera 18 for capturing images of the outside of the vehicle 10 and an internal camera 19 for capturing images of the inside of the vehicle 10 are attached to the vehicle 10. The external camera 18 is, for example, a camera that captures an area that needs to be checked for safety when the vehicle 10 is being driven. Also, the internal camera 19 is, for example, a camera that captures an area necessary for monitoring passengers, and is a camera that captures a place where passengers can enter. Note that there may be a plurality of external cameras 18 and a plurality of internal cameras 19, respectively. The image data captured by the external camera 18 and the internal camera 19 are compressed at a predetermined compression rate and transmitted to the center server 30.

In the center server 30, the manager monitors the outside and inside of the vehicle 10 based on the image data. For example, the manager views the image data captured by the external camera 18 (hereinafter also referred to as external image data), and monitors whether the vehicle 10 comes into contact with external obstacles. Also, for example, the manager views the image data captured by the internal camera 19 (hereinafter, also referred to as internal image data), and monitors whether a passenger is walking, standing, falling, or abnormal in the vehicle 10. Note that the external image data is an example of first image data, and the internal image data is an example of second image data.

The manager operates the vehicle 10 by remote control or requests the dispatch of an ambulance when an abnormality occurs or is likely to occur inside or outside the vehicle 10.

Figure 2:
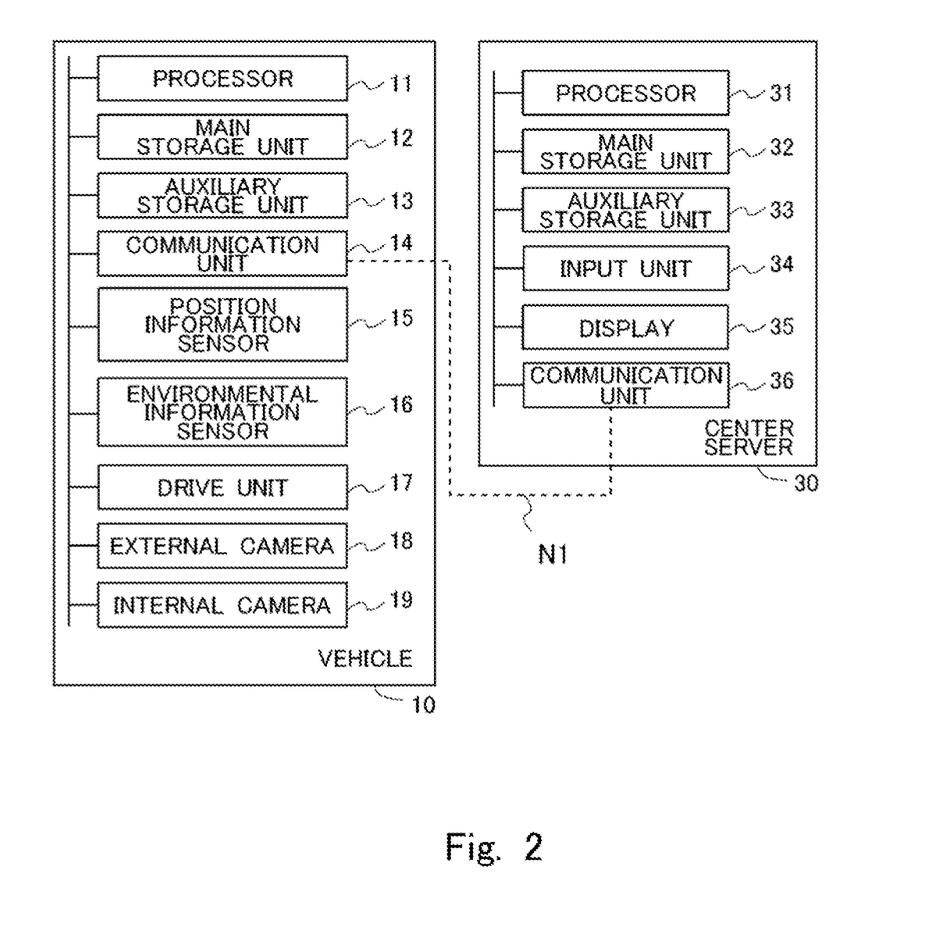
FIG. 2 is a block diagram schematically illustrating an example of a configuration of each of a vehicle and a center server, which together constitute the system according to the embodiment.

Hardware configurations and functional configurations of the vehicle 10 and the center server 30 will be described based on FIG. 2. FIG. 2 is a block diagram schematically illustrating an example of a configuration of each of the vehicle 10 and the center server 30, which together constitute the system 1 according to the present embodiment.

The center server 30 has a configuration of a general computer. The center server 30 includes a processor 31, a main storage unit 32, an auxiliary storage unit 33, an input unit 34, a display 35, and a communication unit 36. These components are connected to one another by means of a bus.

The processor 31 is a CPU (Central Processing Unit), a DSP (Digital Signal Processor), or the like. The processor 31 controls the center server 30 thereby to perform various information processing operations. The main storage unit 32 is a RAM (Random Access Memory), a ROM (Read Only Memory), or the like. The auxiliary storage unit 33 is an EPROM (Erasable Programmable ROM), a hard disk drive (HDD), a removable medium, or the like. The auxiliary storage unit 33 stores an operating system (OS), various programs, various tables, and the like. The processor 31 loads a program stored in the auxiliary storage unit 33 into a work area of the main storage unit 32 and executes the program, so that each component or the like is controlled through the execution of the program. Thus, the center server 30 realizes functions matching predetermined purposes, respectively. The main storage unit 32 and the auxiliary storage unit 33 are computer readable recording media. Here, note that the center server 30 may be a single computer or a plurality of computers that cooperate with one another. In addition, the information stored in the auxiliary storage unit 33 may be stored in the main storage unit 32. Also, the information stored in the main storage unit 32 may be stored in the auxiliary storage unit 33.

The input unit 34 is a means or unit that receives an input operation performed by the manager, and is, for example, a touch panel, a mouse, a keyboard, a microphone, or the like. The display 35 is a means or unit that presents information to the manager, and is, for example, an LCD (Liquid Crystal Display), an EL (Electroluminescence) panel, or the like. Note that the input unit 34 and the display 35 may be configured as a single touch panel display.

The communication unit 36 is a means or unit that communicates with the vehicle 10 via the network N1. The communication unit 36 is, for example, a LAN (Local Area Network) interface board, a wireless communication circuit for wireless communication, or the like. The LAN interface board or the wireless communication circuit is connected to the network N1.

Next, the vehicle 10 is, for example, a moving object that is capable of autonomously traveling, and has a computer. The vehicle 10 includes a processor 11, a main storage unit 12, an auxiliary storage unit 13, a communication unit 14, a position information sensor 15, an environmental information sensor 16, a drive unit 17, an external camera 18, and an internal camera 19. These components are connected to one another by means of a bus. The processor 11, the main storage unit 12, and the auxiliary storage unit 13 are the same as the processor 31, the main storage unit 32, and the auxiliary storage unit 33 of the center server 30, respectively, and hence, the description thereof will be omitted. Note that the processor 11 is an example of a controller. In addition, the main storage unit 32 or the auxiliary storage unit 33 is an example of a storage unit.

The communication unit 14 is a communication means or unit for connecting the vehicle 10 to the network N1. The communication unit 14 is, for example, a circuit for communicating with other devices (e.g., the center server 30 and the like) via the network N1 by making use of a mobile communication service (e.g., a telephone communication network such as 5G (5th Generation), 4G (4th Generation), 3G (3rd Generation), LTE (Long Term Evolution) or the like), or a wireless communication such as Wi-Fi (registered trademark), Bluetooth (registered trademark) or the like.

The position information sensor 15 obtains position information (e.g., latitude and longitude) of the vehicle 10 at a predetermined cycle. The position information sensor 15 is, for example, a GPS (Global Positioning System) receiver unit, a wireless communication unit or the like. The information obtained by the position information sensor 15 is recorded in, for example, the auxiliary storage unit 13 or the like, and transmitted to the center server 30.

The environmental information sensor 16 is a means or unit for sensing the state of the vehicle 10 or sensing the area around the vehicle 10. As a sensor for sensing the state of the vehicle 10, there is mentioned a gyro sensor, an acceleration sensor, an azimuth sensor, or the like. Also, as a sensor for sensing the area around the vehicle 10, there is mentioned a stereo camera, a laser scanner, a LIDAR, a radar, or the like. Note that the external camera 18 to be described later may also be used as the environmental information sensor 16.

The drive unit 17 is a device for driving the vehicle 10 based on control commands generated by the processor 11. The drive unit 17 is configured to include, for example, a plurality of motors or the like for driving the vehicle 10, so that the plurality of motors or the like are driven according to the control commands to achieve autonomous driving of the vehicle 10.

The external camera 18 is a camera that is installed toward the outside of the vehicle 10, and is a camera that captures images of the outside of the vehicle 10 (see broken lines in FIG. 1). The external camera 18 is a camera that captures images by using an imaging device such as a CCD (Charge Coupled Device) image sensor, a CMOS (Complementary Metal Oxide Semiconductor) image sensor or the like. The images captured by the external camera 18 may be still images or moving images, but it is assumed that the external camera 18 captures moving images in present embodiment.

The internal camera 19 is a camera that is installed toward the inside of the vehicle 10, and is a camera that captures images of the inside of the vehicle 10 (see one dot chain lines in FIG. 1). The internal camera 19 is a camera that captures images by using an imaging device such as a CCD (Charge Coupled Device) image sensor, a CMOS (Complementary Metal Oxide Semiconductor) image sensor or the like. The images captured by the internal camera 19 may be either still images or moving images, but it is assumed that the internal camera 19 captures moving images in present embodiment. Note that the external camera 18 and the internal camera 19 are cameras having the same specifications. By using cameras of the same specifications, for example, the cost of purchasing the cameras can be reduced.

Figure 3:
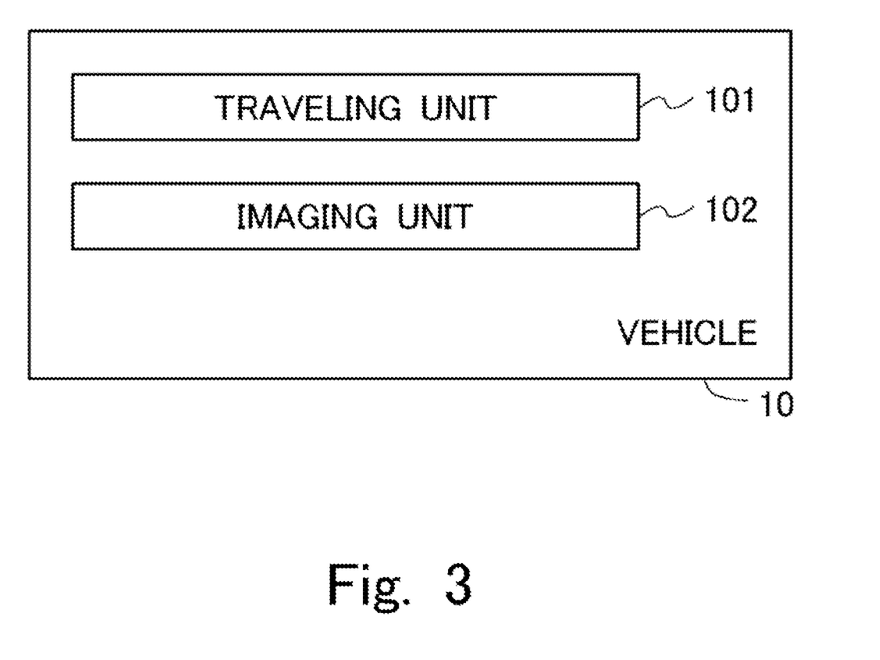
FIG. 3 is a diagram illustrating a functional configuration of the vehicle.

Now, the functions of the vehicle 10 will be described. FIG. 3 is a view illustrating a functional configuration of the vehicle 10. The vehicle 10 includes, as its functional components, a traveling unit 101 and an imaging unit 102. The processor 11 of the vehicle 10 executes the processing of the traveling unit 101 and the imaging unit 102 by a computer program on the main storage unit 12. However, any of the individual functional components or a part of the processing thereof may be implemented by a hardware circuit. Here, note that any of the individual functional components of the vehicle 10 or a part of the processing thereof may be executed by another or other computers connected to the network N1.

The traveling unit 101 controls traveling of the vehicle 10 during autonomous traveling of the vehicle 10. The traveling unit 101 generates control commands for controlling the drive unit 17 by using the data detected by the environmental information sensor 16. The traveling unit 101 controls, for example, the speed, the steering angle, and the like of the vehicle 10 by controlling a plurality of motors to generate a difference in the rotational speed of a plurality of rotors.

For example, the traveling unit 101 generates a travel trajectory of the vehicle 10 based on the data detected by the environmental information sensor 16, and controls the drive unit 17 so that the vehicle 10 travels along the travel trajectory. Here, note that as a method of causing the vehicle 10 to travel in an autonomous manner, there can be adopted a known method. The traveling unit 101 may perform feedback control based on the detection value of the environmental information sensor 16 during autonomous traveling. The traveling unit 101 controls the drive unit 17 so that the vehicle 10 autonomously travels around a predetermined route. This route is included in the operation commands transmitted from the server 30.

In addition, the traveling unit 101 controls traveling of the vehicle 10 during remote operation of the vehicle 10. The traveling unit 101 generates control commands for controlling the drive unit 17 based on the commands received from the center server 30. As a method of remotely operating the vehicle 10, a known method can be adopted.

The imaging unit 102 images or captures the outside and the inside of the vehicle 10 by means of the external camera 18 and the internal camera 19. After adjusting the resolution of the image data captured by the external camera 18 and the internal camera 19, the imaging unit 102 compresses (encodes) the image data in a predetermined moving image (video) compression format and transmits the compressed image data to the center server 30. For example, "H.264/MPEG-4 AVC" or "H.265/MPEG-H HEVC" can be adopted as the moving image compression format. Therefore, the imaging unit 102 has a function of an encoder. The imaging unit 102 transmits the compressed external image data or internal image data to the center server 30.

The imaging unit 102 switches the imaging mode based on an imaging mode switching command received from the center server 30. The imaging mode switching command is a command generated by the center server 30, e.g., a command for switching to an imaging mode according to an input by the manager. The imaging mode includes an external imaging mode, an internal imaging mode, and an external and internal imaging mode.

The external imaging mode is an imaging mode in which imaging or capturing is performed only by the external camera 18 and only external image data is transmitted to the center server 30. Also, the internal imaging mode is an imaging mode in which imaging is performed only by the internal camera 19 and only internal image data is transmitted to the center server 30. In addition, the external and internal imaging mode is an imaging mode in which imaging is performed by both the external camera 18 and the internal camera 19, and both external image data and internal image data are transmitted to the center server 30.

Then, the imaging unit 102 generates both the external and internal image data in such a manner that the volume of the internal image data when imaging is performed in the internal imaging mode is larger than the volume of the external image data when imaging is performed in the external imaging mode. A comparison may be made between the external image data before compression and the internal image data before compression, or between the external image data after compression and the internal image data after compression. For example, the external camera 18 may output low-resolution image data, while the internal camera 19 may output high-resolution image data. For example, the resolution of the external image data to be transmitted to the center server 30 in the external imaging mode is set to 720×1280 pixels, and the resolution of internal image data to be transmitted to the center server 30 in the internal imaging mode is set to 1080×1920 pixels.

In addition, the imaging unit 102 makes the volume of the internal image data when imaging when captured in the external and internal imaging mode smaller than the volume of the internal image data when captured in the internal imaging mode. For example, the volume of the internal image data when captured in the external and internal imaging mode may be equal to the volume of the external image data when captured in the external imaging mode. For example, the resolution of the internal image data to be transmitted to the center server 30 in the external and internal imaging mode is set to 720×1280 pixels, and the resolution of the internal image data to be transmitted to the center server 30 in the internal imaging mode is set to 1080×1920 pixels.

Figure 4:
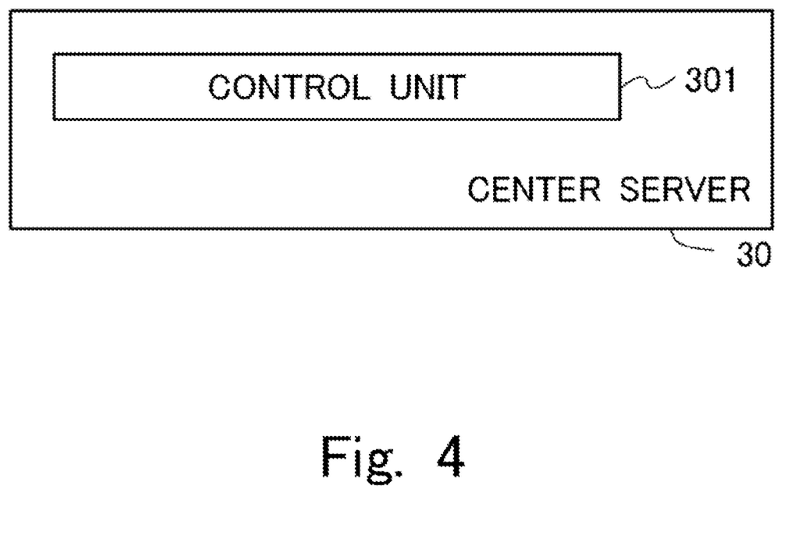
FIG. 4 is a diagram illustrating by way of example a functional configuration of the center server.

Then, the functions of the center server 30 will be described. FIG. 4 is a diagram illustrating an example of a functional configuration of the center server 30. The center server 30 includes a control unit 301 as a functional component. The processor 31 of the center server 30 executes the processing of the control unit 301 by a computer program on the main storage unit 32. However, any of the individual functional components or a part of the processing thereof may be implemented by a hardware circuit.

The control unit 301 generates operation commands, which are commands for operating the vehicle 10. The operation commands include, for example, a route of the vehicle 10. For example, the control unit 301 generates an operation command so that the vehicle 10 departs from its current location (e.g., a base station) and returns to the base station via each stop. At each stop, a command may be included which opens or closes a door to allow passengers to get on or off. Map information may have been stored in the auxiliary storage unit 33 in order to generate the route of the vehicle 10.

Moreover, the control unit 301 generates an imaging mode switching command in accordance with the information input by the manager via the input unit 34. For example, the control unit 301 outputs a GUI for selecting an imaging mode to the display 35, and obtains the imaging mode selected by the manager via the input unit 34. Then, the control unit 301 generates an imaging mode switching command and transmits it to the vehicle 10 so that the vehicle 10 switches to that imaging mode.

Further, the control unit 301 outputs the external image data or the internal image data received from the vehicle 10 to the display 35. To this end, the control unit 301 decodes the received external image data and the internal image data. Thus, the control unit 301 has the function of a decoder. The control unit 301 decodes the external image data and the internal image data by executing a program for decoding the image data stored in the auxiliary storage unit 33.

For example, when the center server 30 receives the external image data captured in the external imaging mode, the control unit 301 outputs the external image data to the display 35. In cases where the vehicle 10 is provided with a plurality of external cameras 18, there will also be a plurality of pieces of external image data. The control unit 301 may output the plurality of pieces of external image data so that the plurality of pieces of external image data are all displayed on the display 35. For example, in cases where the vehicle 10 is provided with four external cameras 18, the display 35 may be divided into four sections, and four pieces of external image data can be output for each of them. In addition, of the plurality of pieces of external image data, the control unit 301 may display one or more pieces of the external image data selected by the manager via the input unit 34 on the display 35 in an enlarged scale. Moreover, in cases where the vehicle 10 is provided with a plurality of displays 35, different pieces of external image data may be displayed on the individual displays 35, respectively.

Further, for example, when the center server 30 receives the internal image data captured in the internal imaging mode, the control unit 301 outputs the internal image data to the display 35. In cases where the vehicle 10 is provided with a plurality of internal cameras 19, there will also be a plurality of pieces of internal image data. The control unit 301 may output the plurality of pieces of internal image data so that the plurality of pieces of internal image data are all displayed on the display 35. For example, in cases where the vehicle 10 is provided with four internal cameras 19, the display 35 may be divided into four sections, and four pieces of internal image data can be output for each of them. In addition, of the plurality of pieces of internal image data, the control unit 301 may display one or more pieces of the internal image data selected by the manager via the input unit 34 on the display 35 in an enlarged scale. Moreover, in cases where the vehicle 10 is provided with a plurality of displays 35, different pieces of internal image data may be displayed on the individual displays 35, respectively.

For example, when the center server 30 receives the external image data and the internal image data captured in the external and internal imaging mode, the control unit 301 outputs the external image data and the internal image data to the display 35. In cases where the vehicle 10 is provided with a plurality of external cameras 18 and a plurality of internal cameras 19, there will also be a plurality of pieces of external image data and a plurality of pieces of internal image data. The control unit 301 may output the plurality of pieces of external image data and internal image data so that the plurality of pieces of external image data and internal image data are all displayed on the display 35. For example, in cases where the vehicle 10 is provided with four external cameras 18 and four internal cameras 19, the display 35 may be divided into eight sections to output four pieces of external image data and four pieces of internal image data. In addition, of the plurality of pieces of external and internal image data, the control unit 301 may display one or more pieces of the image data selected by the manager via the input unit 34 on the display 35 in an enlarged scale. Moreover, in cases where the vehicle 10 is provided with a plurality of displays 35, different pieces of image data may be displayed on the individual displays 35, respectively.

As described above, the manager can simultaneously view images captured from a plurality of angles. Then, the control unit 301 generates operation commands for remotely operating the vehicle 10 in accordance with information input by the manager via the input unit 34. For example, when the manager makes an input to stop the vehicle 10, the control unit 301 generates and transmits an operation command to the vehicle 10 so that the vehicle 10 is stopped immediately. Also, when the manager makes an input to change the course of the vehicle 10, the control unit 301 generates and transmits an operation command to the vehicle 10 so that the course of the vehicle 10 is changed. In addition, the control unit 301 may generate, for example, information requesting the dispatch of an ambulance in response to information input to the input unit 34 by the manager, and transmit the information to an emergency center that arranges the ambulance.

Figure 5:
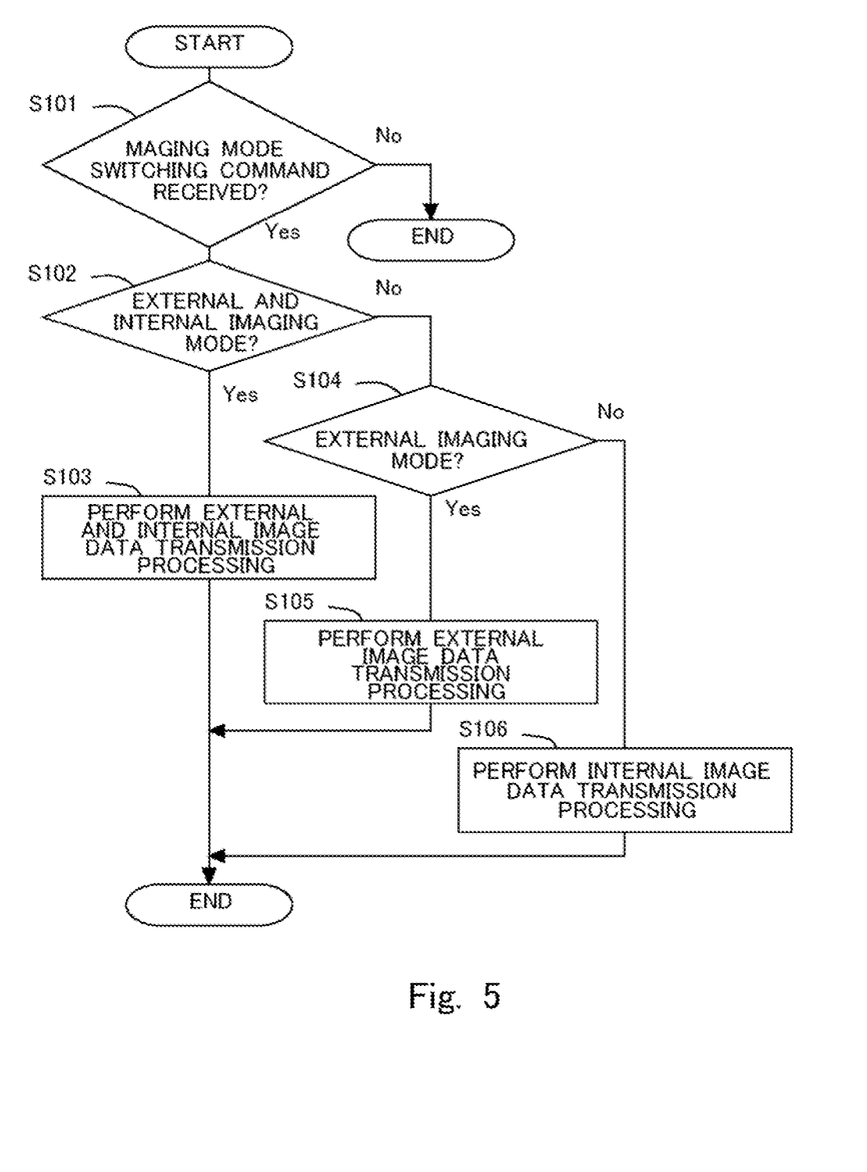
FIG. 5 is a flowchart of image data transmission processing according to the embodiment.

Next, image data transmission processing in the vehicle 10 will be described. FIG. 5 is a flowchart of the image data transmission processing according to the present embodiment. The image data transmission processing illustrated in FIG. 5 is executed at predetermined time intervals in the vehicle 10.

In step S101, the imaging unit 102 determines whether or not an imaging mode switching command has been received from the center server 30. When an affirmative determination is made in step S101, the processing or routine proceeds to step S102, whereas when a negative determination is made, this routine is ended. In step S102, the imaging unit 102 determines whether or not the imaging mode switching command thus received is a command for switching to the external and internal imaging mode. When an affirmative determination is made in step S102, the processing proceeds to step S103, whereas when a negative determination is made, the processing proceeds to step S104.

Figure 6:
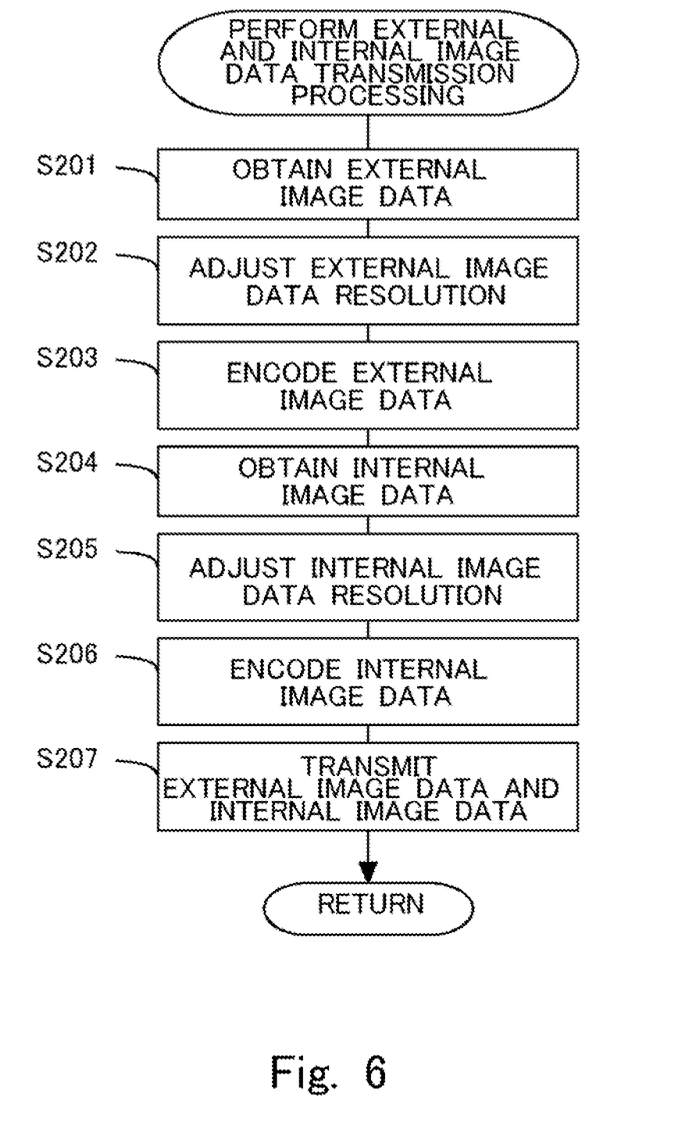
FIG. 6 is a view illustrating a flowchart of external and internal image data transmission processing.

In step S103, the imaging unit 102 executes the external and internal image data transmission processing. FIG. 6 is a view illustrating a flowchart of external and internal image data transmission processing. In step S201, the imaging unit 102 obtains external image data. In cases where a plurality of external cameras 18 are provided, respective pieces of external image data corresponding to all the external cameras 18 are obtained. The imaging unit 102 obtains external image data that has been obtained during a period of time from the previous routine to the current routine.

In step S202, the imaging unit 102 adjusts the resolution of the external image data. Here, the resolution of the external image data is adjusted so as to be lower than the resolution of the internal image data, which will be adjusted in step S205 to be described later. The resolution of the external image data corresponding to the external and internal image data transmission processing may have been determined in advance. In step S203, the imaging unit 102 encodes the external image data whose resolution has been adjusted.

In step S204, the imaging unit 102 obtains internal image data. In cases where a plurality of internal cameras 19 are provided, respective pieces of internal image data corresponding to all the internal cameras 19 are obtained. The imaging unit 102 obtains internal image data that has been obtained during the period of time from the previous routine to the current routine. In step S205, the imaging unit 102 adjusts the resolution of the internal image data. Here, the resolution of the internal image data is adjusted so as to be higher than the resolution of the external image data adjusted in step S202 described above and lower than the resolution of the internal image data, which will be adjusted in step S402 described below. The resolution of the internal image data corresponding to the external and internal image data transmission processing may have been determined in advance. In step S206, the imaging unit 102 encodes the internal image data whose resolution has been adjusted.

Then, in step S207, the imaging unit 102 transmits the external image data and the internal image data thus encoded to the center server 30.

Returning to FIG. 5, in step S104, it is determined whether or not the received imaging mode switching command is a command for switching to the external imaging mode. When an affirmative determination is made in step S104, the processing proceeds to step S105, whereas when a negative determination is made, the processing proceeds to step S106.

Figure 7:
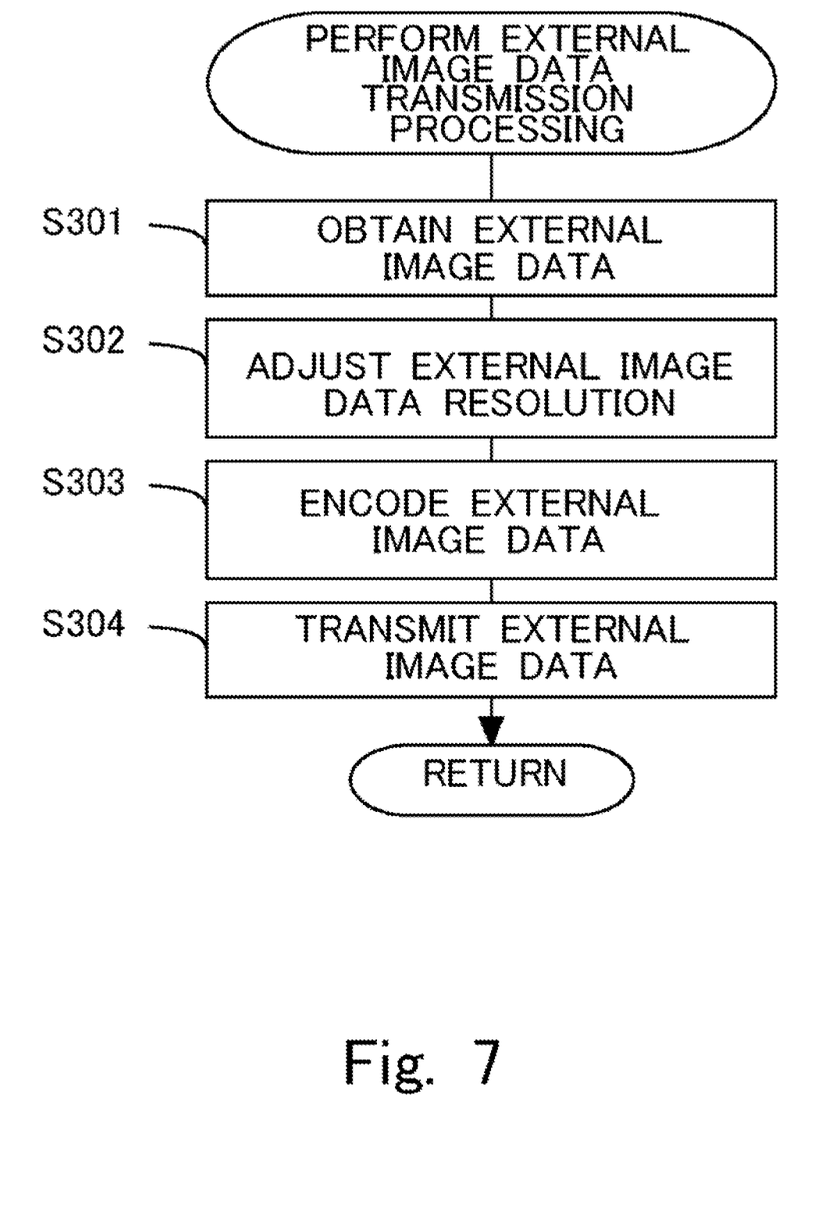
FIG. 7 is a view illustrating a flowchart of external image data transmission processing.

In step S105, the imaging unit 102 executes external image data transmission processing. FIG. 7 is a view illustrating a flowchart of the external image data transmission processing. In step S301, the imaging unit 102 obtains external image data. In cases where a plurality of external cameras 18 are provided, respective pieces of external image data corresponding to all the external cameras 18 are obtained. The imaging unit 102 obtains external image data that has been obtained during a period of time from the previous routine to the current routine.

In step S302, the imaging unit 102 adjusts the resolution of the external image data. Here, the resolution of the external image data is adjusted so as to be lower than the resolution of the internal image data, which will be adjusted in step S402 to be described later. The resolution of the external image data corresponding to the external image data transmission processing may have been determined in advance. In step S203, the imaging unit 102 encodes the external image data whose resolution has been adjusted. In step S304, the imaging unit 102 transmits the encoded external image data to the center server 30.

Figure 8:
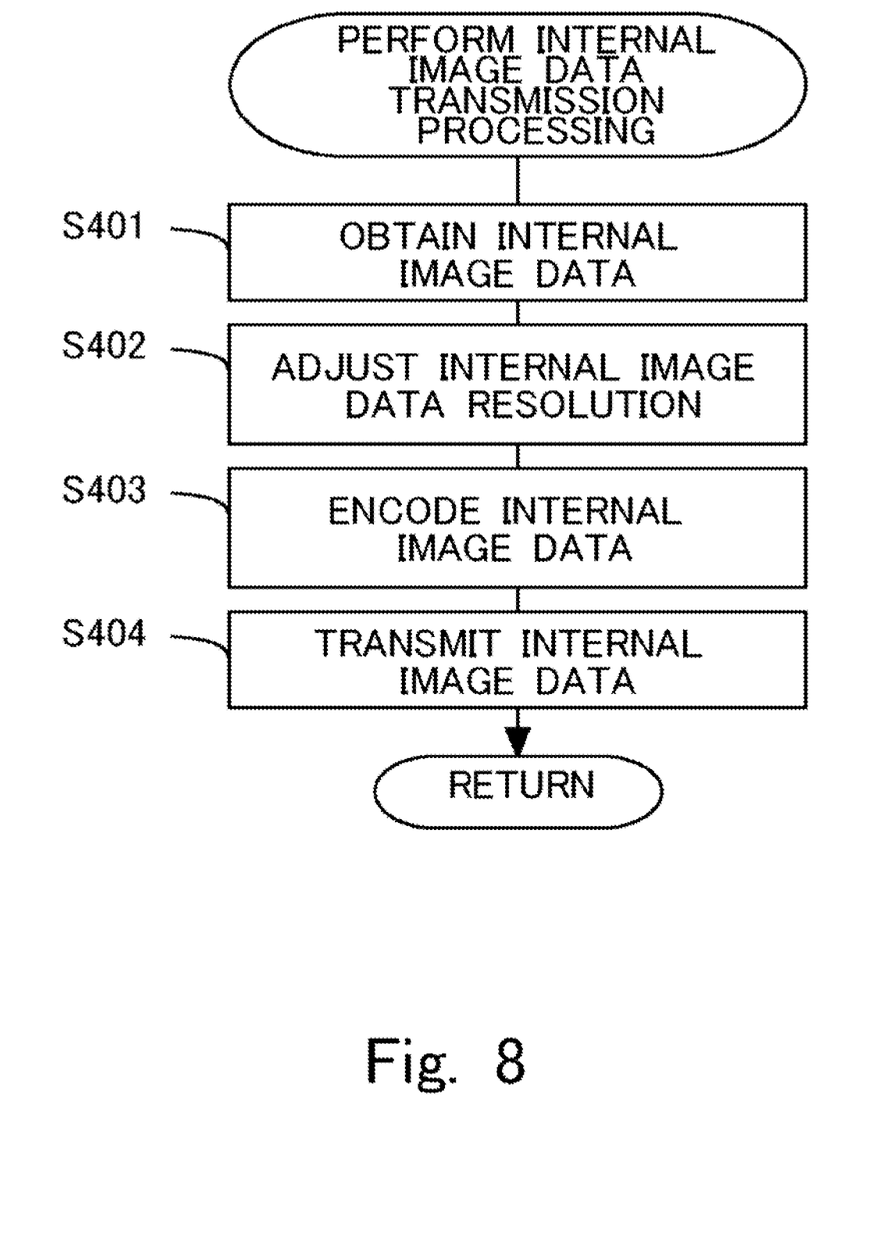
FIG. 8 is a view illustrating a flowchart of internal image data transmission processing.

Returning to FIG. 5, in step S106, the imaging unit 102 performs internal image data transmission processing. FIG. 8 is a view illustrating a flowchart of the internal image data transmission processing. In step S401, the imaging unit 102 obtains internal image data. In cases where a plurality of internal cameras 19 are provided, respective pieces of internal image data corresponding to all the internal cameras 19 are obtained. The imaging unit 102 obtains internal image data that has been obtained during the period of time from the previous routine to the current routine.

In step S402, the imaging unit 102 adjusts the resolution of the internal image data. Here, the resolution of the internal image data is adjusted so as to be higher than the resolution of the internal image data adjusted in step S205 described above and higher than the resolution of the external image data adjusted in step S302 described above. The resolution of the internal image data corresponding to the internal image data transmission processing may have been determined in advance. In step S403, the imaging unit 102 encodes the internal image data whose resolution has been adjusted. In step S404, the imaging unit 102 transmits the encoded internal image data to the center server 30.

As described above, according to the present embodiment, the volume of image data in the external imaging mode is made smaller than that in the internal imaging mode, thus making it possible to shorten a time delay when the center server 30 obtains image data outside the vehicle 10. Therefore, remote control based on the external image data is facilitated. On the other hand, image data inside the vehicle 10 has a large volume, so that images having a high resolution can be obtained. Therefore, it is possible to know the state of the passengers in more detail. In addition, since the volume of the internal image data is made smaller in the case of the external and internal imaging mode than in the case of the internal imaging mode, it is possible to suppress an increase in time delay when the center server 30 receives the external image data and the internal image data in the case of the external and internal imaging mode.

Here, note that in the above description, it is assumed that three imaging modes are provided, but as an alternative, there may be provided only two imaging modes, an external imaging mode and an internal imaging mode. In this case, the volume of the external image data to be transmitted to the center server 30 in the external imaging mode should be smaller than the volume of the internal image data to be transmitted to the center server 30 in the internal imaging mode.

Also, in the above description, the imaging unit 102 switches the imaging mode when an imaging mode switching command is received from the center server 30, but as an alternative, the imaging unit 102 may switch the imaging mode based on the position information of the vehicle 10. For example, in a predetermined area including a stop, the imaging unit 102 may switch the imaging mode to the external and internal imaging mode. In addition, the imaging unit 102 may switch the imaging mode to the external imaging mode in a place where it is necessary to monitor the outside of the vehicle 10, such as a merging point of roads or the like.

Other Embodiments

The above-described embodiment is merely an example, but the present disclosure can be implemented with appropriate modifications without departing from the spirit thereof.

The processing and/or means (devices, units, etc.) described in the present disclosure can be freely combined and implemented as long as no technical contradiction occurs.

The processing described as being performed by one device or unit may be shared and performed by a plurality of devices or units. Alternatively, the processing described as being performed by different devices or units may be performed by one device or unit. In a computer system, a hardware configuration (server configuration) for realizing each function thereof can be changed in a flexible manner.

The present disclosure can also be realized by supplying to a computer a computer program in which the functions described in the above-described embodiment are implemented, and reading out and executing the program by means of one or more processors included in the computer. Such a computer program may be provided to the computer by a non-transitory computer readable storage medium that can be connected to a system bus of the computer, or may be provided to the computer via a network. The non-transitory computer readable storage medium includes, for example, any type of disk such as a magnetic disk (e.g., a floppy (registered trademark) disk, a hard disk drive (HDD), etc.), an optical disk (e.g., a CD-ROM, a DVD disk, a Blu-ray disk, etc.) or the like, a read-only memory (ROM), a random-access memory (RAM), an EPROM, an EEPROM, a magnetic card, a flash memory, an optical card, or any type of medium suitable for storing electronic commands or instructions.

What is claimed is:

1. An autonomous traveling vehicle including a controller, an external camera and an internal camera, wherein
the controller is configured to perform:
receiving, from a server that monitors the autonomous traveling vehicle, an imaging mode switching command for switching an imaging mode, the imaging mode switching command including any of a selection of an external imaging mode, an internal imaging mode, and an external and internal imaging mode;
determining, in the received imaging mode switching command, which imaging mode is selected among the external imaging mode, the internal imaging mode, and the external and internal imaging mode; and
transmitting, as image data requested by the received imaging mode switching command, external image data to the server in response to the imaging mode switching command including a selection of the external imaging mode, the external image data obtained by imaging an outside of the autonomous traveling vehicle by the external camera;
transmitting, as the image data requested by the received imaging mode switching command, internal image data to the server in response to the imaging mode switching command including a selection of the internal imaging mode, the internal image data obtained by imaging an inside of the autonomous traveling vehicle by the internal camera; and
transmitting, as the image data requested by the received imaging mode switching command, both the external image data and the internal image data to the server in response to the imaging mode switching command including a selection of the external and internal imaging mode, wherein
a first imaging resolution of the image data at the time of capturing the external image data in the external imaging mode is determined in advance, as a predetermined setting of the external imaging mode, so as to be lower than a second imaging resolution of the image data at the time of capturing the internal image data in the internal imaging mode, the second imaging resolution being a predetermined setting of the internal imaging mode, and
a third imaging resolution at the time of capturing the internal image data in the external and internal imaging mode is determined in advance, as a predetermined setting of the external and internal imaging mode, so as to be lower than the second imaging resolution at the time of capturing the internal image data in the internal imaging mode.

2. The autonomous traveling vehicle according to claim 1, wherein
the controller compresses the external image data and the internal image data at a predetermined compression rate.

3. The autonomous traveling vehicle according to claim 1, wherein
the external image data or the internal image data includes a plurality of pieces of image data.

4. An information processing method performed by a controller included in an autonomous traveling vehicle,
the autonomous traveling vehicle including an external camera and an internal camera, wherein
the information processing method comprises, by the controller, performing:
receiving, from a server that monitors the autonomous traveling vehicle, an imaging mode switching command for switching an imaging mode, the imaging mode switching command including any of a selection of an external imaging mode, an internal imaging mode, and an external and internal imaging mode;
determining, in the received imaging mode switching command, which imaging mode is selected among the external imaging mode, the internal imaging mode, and the external and internal imaging mode; and
transmitting, as image data requested by the received imaging mode switching command, external image data to the server in response to the imaging mode switching command including a selection of the external imaging mode, the external image data obtained by imaging an outside of the autonomous traveling vehicle by the external camera;
transmitting, as the image data requested by the received imaging mode switching command, internal image data to the server in response to the imaging mode switching command including a selection of the internal imaging mode, the internal image data obtained by imaging an inside of the autonomous traveling vehicle by the internal camera; and
transmitting, as the image data requested by the received imaging mode switching command, both the external image data and the internal image data to the server in response to the imaging mode switching command including a selection of the external and internal imaging mode; wherein
a first imaging resolution of the image data at the time of capturing the external image data in the external imaging mode is determined in advance, as a predetermined setting of the external imaging mode, so as to be lower than a second imaging resolution of the image data at the time of capturing the internal image data in the internal imaging mode, the second imaging resolution being a predetermined setting of the internal imaging mode, and
a third imaging resolution at the time of capturing the internal image data in the external and internal imaging mode is determined in advance, as a predetermined setting of the external and internal imaging mode, so as to be lower than the second imaging resolution at the time of capturing the internal image data in the internal imaging mode.

5. The information processing method according to claim 4, further comprising:
causing the computer to compress the external image data and the internal image data at a predetermined compression rate.

6. The information processing method according to claim 4, wherein the external image data or the internal image data includes a plurality of pieces of image data.

7. A non-transitory storage medium storing a program for causing a controller included in an autonomous traveling vehicle to perform an information processing method, the autonomous traveling vehicle including an external camera and an internal camera, wherein the program causing the controller to perform as the information processing method:

receiving, from a server that monitors the autonomous traveling vehicle, an imaging mode switching command for switching an imaging mode, the imaging mode switching command including any of a selection of an external imaging mode, an internal imaging mode, and an external and internal imaging mode;

determining, in the received imaging mode switching command, which imaging mode is selected among the external imaging mode, the internal imaging mode, and the external and internal imaging mode; and transmitting, as image data requested by the received imaging mode switching command, external image data to the server in response to the imaging mode switching command including a selection of the external imaging mode, the external image data obtained by imaging an outside of the autonomous traveling vehicle by the external camera;

transmitting, as the image data requested by the received imaging mode switching command, internal image data to the server in response to the imaging mode switching command including a selection of the internal imaging mode, the internal image data obtained by imaging an inside of the autonomous traveling vehicle by the internal camera; and transmitting, as the image data requested by the received imaging mode switching command, both the external image data and the internal image data to the server in response to the imaging mode switching command including a selection of the external and internal imaging mode; wherein a first imaging resolution of the image data at the time of capturing the external image data in the external imaging mode is determined in advance, as a predetermined setting of the external imaging mode, so as to be lower than a second imaging resolution of the image data at the time of capturing the internal image data in the internal imaging mode, the second imaging resolution being a predetermined setting of the internal imaging mode, and a third imaging resolution at the time of capturing the internal image data in the external and internal imaging mode is determined in advance, as a predetermined setting of the external and internal imaging mode, so as to be lower than the second imaging resolution at the time of capturing the internal image data in the internal imaging mode.

8. The non-transitory storage medium storing a program according to claim 7, the program causing the controller to compress the external image data and the internal image data at a predetermined compression rate.

9. The non-transitory storage medium storing a program according to claim 7, the external image data or the internal image data includes a plurality of pieces of image data.

10. The autonomous traveling vehicle according to claim 1, wherein the controller is further configured to control physical motion of the autonomous traveling vehicle based on a command sent back to the autonomous traveling vehicle from the server in response to the image data being analyzed at the server, and the physical motion comprises at least one of physically continuing a driving of the autonomous traveling vehicle, physically changing a course of the driving of the autonomous traveling vehicle, and physically stopping the driving of the autonomous traveling vehicle.

* * * * *

UNITED STATES PATENT AND TRADEMARK OFFICE
CERTIFICATE OF CORRECTION

| | | |
|---|---|---|
| PATENT NO. | : 12,407,842 B2 | Page 1 of 1 |
| APPLICATION NO. | : 17/858502 | |
| DATED | : September 2, 2025 | |
| INVENTOR(S) | : Yu Nagata | |

It is certified that error appears in the above-identified patent and that said Letters Patent is hereby corrected as shown below:

On the Title Page

Item (54) and in the Specification Column 1, Lines 1-4, replace "AUTONOMOUS TRAVELING VEHICLE INFORMATION PROCESSING METHOD, AND NON-TRANSITORY STORAGE MEDIUM" with "AUTONOMOUS TRAVELING VEHICLE, INFORMATION PROCESSING METHOD, AND NON-TRANSITORY STORAGE MEDIUM".

Signed and Sealed this
Fourteenth Day of October, 2025

John A. Squires
*Director of the United States Patent and Trademark Office*